W. S. HARRISON.
Tire-Tightener.
No. 28,982.
Patented July 3, 1860.
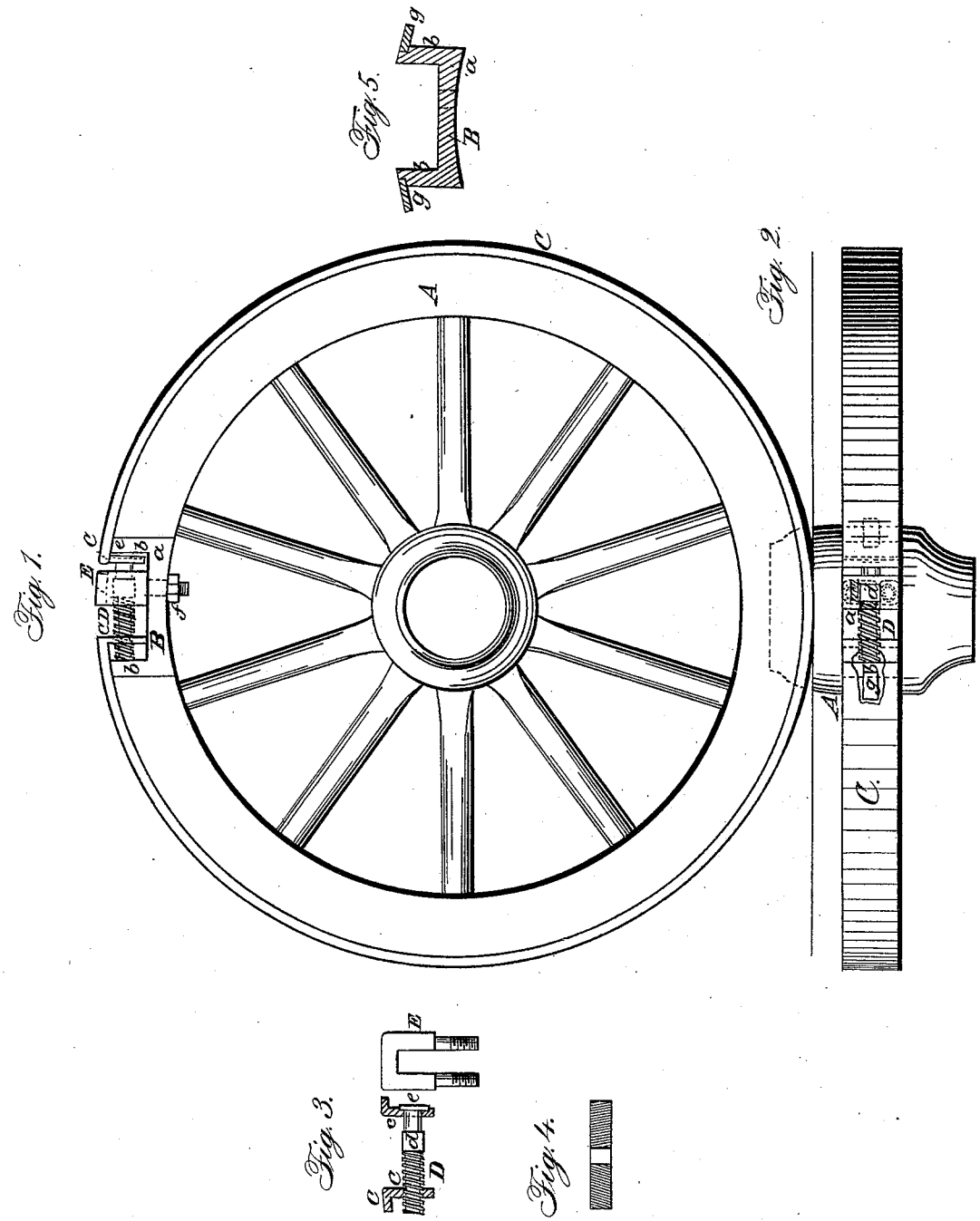
Witnesses:
Lev Coombs
R. S. Spencer
Inventor:
W. S. Harrison
per Munn & Co
Attorneys

UNITED STATES PATENT OFFICE.

W. S. HARRISON, OF CARSONS LANDING, MISSISSIPPI.

ADJUSTING TIRES ON WHEELS.

Specification of Letters Patent No. 28,982, dated July 3, 1860.

*To all whom it may concern:*

Be it known that I, W. S. HARRISON, of Carsons Landing, in the county of Bolivar and State of Mississippi, have invented a new and Improved Mode of Adjusting Tires on Wheels; and I do hereby declare that the following is a full, clear, and exact description of the same, reference being had to the annexed drawings, making a part of this specification, in which—

Figure 1, is a face view of a wheel with its tire adjusted on it according to my invention. Fig. 2, is an eye view of the same. Figs. 3, 4 and 5 are detached views of parts pertaining to my invention.

Similar letters of reference indicate corresponding parts of the several figures.

The object of this invention is to adjust or secure the tire on the wheel in such a manner that it may be tightened and relaxed at pleasure to compensate for any shrinkage or swelling of the wheel.

The invention consists in the employment or use of a metal sectional felly in connection with a screw-rod, cap and lips on the tire, all arranged as hereinafter described to effect the desired end.

To enable those skilled in the art to fully understand and construct my invention, I will proceed to describe it.

A, represents a wheel which may be constructed in the usual way, with the exception, that a short metal felly, B, is placed in the wheel. This felly may be described as a bar $a$ provided at each end with a lip $b$, the length of which is equal to the thickness of the fellies, the lips $b$, abutting against the ends of the adjoining fellies, and the bar $a$, being flush with the inner edges of the fellies as clearly shown in Fig. 1.

C, represents the tire of the wheel, which instead of being united to form a complete band as usual, is divided and has its ends turned down to form lips $c$, $c$, which project over the lips $b$ of the bar $a$, one being pieced and having an internal screw-thread cut in it—the other being also pieced, but not provided with an internal screw.

In the lips $c$, $c$, a screw-rod, D, is fitted, said rod having a square, $d$, upon it between the lips $c$, $c$, and the head $e$, at the outer side of the lip $c$, which has the smooth aperture; see Fig. 3.

E, represents a cap which is of staple form, as shown clearly in Fig. 3. The lower ends of the caps have screw-threads cut on them, and the bar, $a$, of the metal felly, B, is tapped to receive the ends of the cap, nuts, $f$, being fitted on the ends of the cap; see Fig. 1. The metal felly, B, is prevented from moving laterally by means of dowels $g$, which are let in the edges of the lips $a$, $a$, and the outer surfaces of the adjoining fellies, see Figs. 2 and 5.

From the above description it will be seen that by adjusting the felly, B, in the wheel, fitting the dowels $g$, in proper place, and then slipping the tire, C, on the wheel with the screw-rod, D, fitted in its lips $c$, $c$, and turning the rod, D, by applying a wrench to its square, $d$, the tire, C, may be drawn snugly on the wheel. When the tire is properly adjusted on the wheel the cap, E, is fitted over the square, $d$, and the latter prevented from casually moving. The tire of course may be relaxed at any time when required by turning the rod, D, in the proper direction. If desired the rod, D, may be provided with a right and left screw-thread, as shown in Fig. 4, and both lips, $c$, $c$, of the tire provided with internal screw-threads. This plan however would be equivalent to the other.

The metal felly, B, is an important feature of the invention: it serves as a solid bearing for the ends of the under fellies, and protects them as well as the spokes from all undue strain when the tire is contracted upon the wheel. The cap, E, not only prevents the casual turning of the screw-rod D, but also prevents the felly, B, from working inward, while the tire prevents it from working outward.

I am aware that tires have been provided with screw-rods in order that they may be adjusted snugly on the wheels; but so far as I am aware never have been arranged as herein shown, viz., provided with a metal felly, cap, etc., to effect the result specified.

I do not claim therefore separately any of the within described parts; but

I do claim as new and desire to secure by Letters Patent:

The metal felly, B, lips, $c$, $c$, at the ends of the tire, C, the screw-rod D, and cap, E, arranged and applied to the wheel substantially as and for the purpose set forth.

W. S. HARRISON.

Witnesses:
R. M. WILSON,
M. D. FLY.